March 24, 1959 N. E. SPRECHER 2,879,384

PHASE SYNCHRONIZING SYSTEMS

Filed June 29, 1954 2 Sheets-Sheet 1

INVENTOR.
NOAH E. SPRECHER
BY [signature]
ATTORNEY

INVENTOR.
NOAH E. SPRECHER
BY [signature]
ATTORNEY

United States Patent Office 2,879,384
Patented Mar. 24, 1959

2,879,384

PHASE SYNCHRONIZING SYSTEMS

Noah E. Sprecher, Brooklyn, N.Y., assignor to Radio Corporation of America, a corporation of Delaware Application June 29, 1954, Serial No. 440,068

The terminal fifteen years of the term of the patent to be granted has been disclaimed 3 Claims. (Cl. 250—27)

Figure 1:
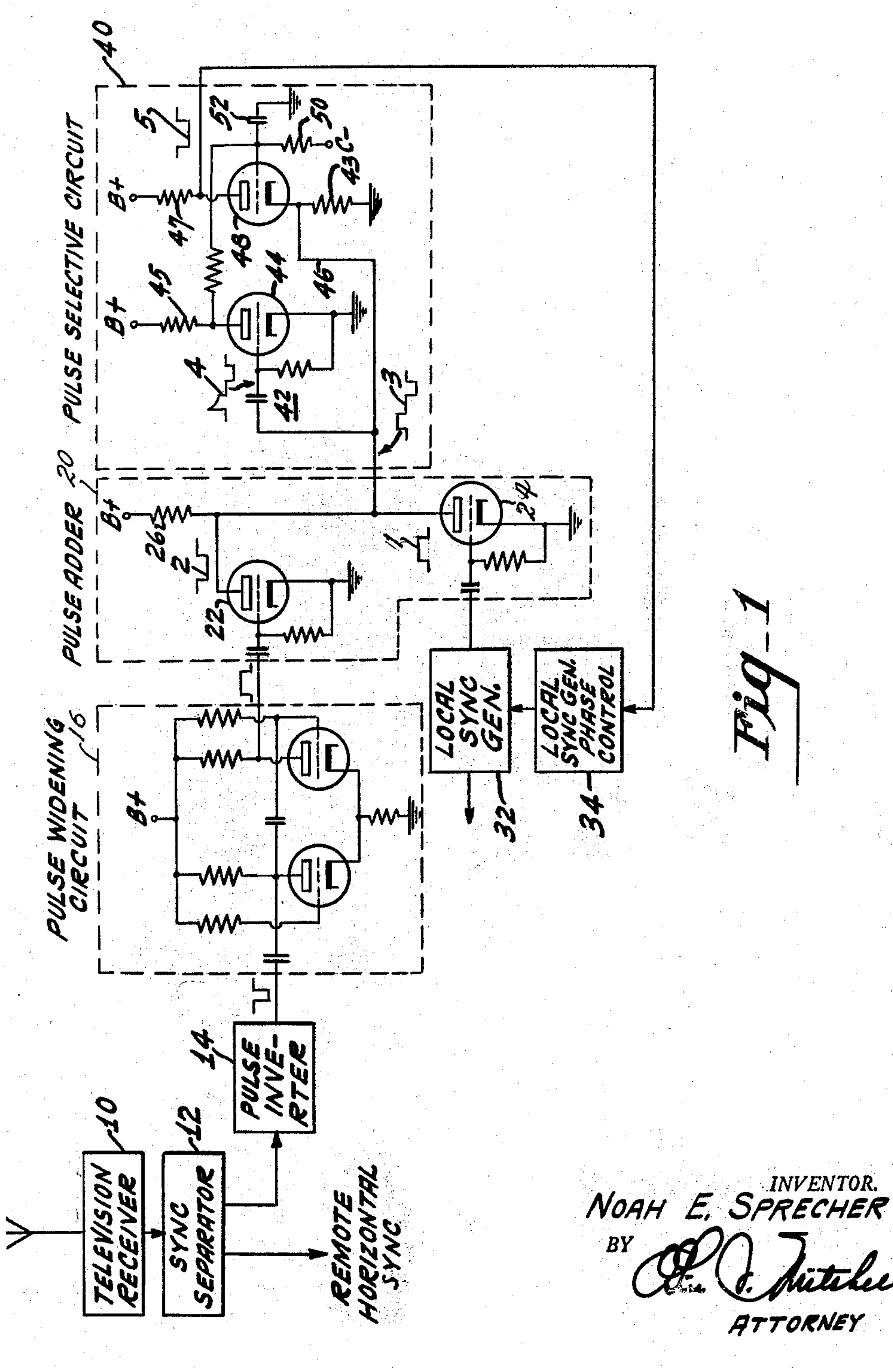

This invention relates to electric wave translating systems, and more particularly to improved arrangements for synchronizing and phasing of two electric signal generators.

A composite video signal as generally transmitted by a television transmitter contains a video component, a synchronizing component, frequently termed by the artisan as a sync component, and a blanking component. The video component carries actual image information, the synchronizing or sync component controls or synchronizes an electron beam scanning a picture, and the blanking component serves to turn off the electron beam scanning the picture during the beam retrace period when no beam is desired. The sync component is composed of vertical sync pulses and horizontal sync pulses. The horizontal sync pulses control line scanning while the vertical sync pulses control field scanning. In the usual situation the synchronizing and the blanking components of the composite video signal are generated in a sync signal generator. Generally the sync signal generator is controlled by a master oscillator, and the master oscillator is in turn linked to a public utility power system. A signal taken from the public utility system provides a frequency reference for the master oscillator.

Improved techniques in video programming often include the use of two distinct program sources. With the use of two program sources the necessary shifting from one program source to another creates an undesirable effect in the received picture unless the two program sources have their synchronizing component signals locked in phase. The undesirable effect is that the picture appears to "rollover." This "rollover" effect is created as the receiver adjusts to a different set of synchronizing signals.

Various other video programming techniques include the use of such effects as dissolves, and superpositions. These effects can only be successfully created if the two video programming sources used to create the effect have synchronizing signals which are locked in phase.

Systems to automatically lock in synchronism two sync pulse generators and which require no manual operation have been devised. In an automatic system synchronizing is generally accomplished by using two circuits. One circuit provides frequency regulation and adjusts the horizontal pulse frequency of a controlled sync signal generator to conform to the horizontal pulse frequency of a controlling sync signal generator. Another circuit in the device then accomplishes phasing of the vertical sync signals. Such a device first synchronizes the frequency of local sync generator master oscillator with the remote sync generator with no regard to the relative overall phasing of the local and remote synchronizing signal composite waveforms. Means are then provided for interrupting the usual fixed timing and phase relationship between local master oscillator operation and the locally formed vertical sync so that the local vertical sync is effectively made to slip or shift with respect to the local horizontal sync. This interrupting means is then placed under the automatic control of a coincidence detector which develops an actuating or correcting signal expressly for the interrupting means in accordance with a degree of coincidence between the remote vertical sync and the local vertical sync. The speed of shift between local vertical sync and local horizontal sync is thereby rendered a positive function of the degree to which local and remote vertical sync fails to coincide. Hence, shift of local vertical sync will occur until coincidence of local and remote vertical sync is obtained at which time the interrupting means will be rendered ineffective and lock in between local and remote sync generators will be established.

In the application of such a device to conventional local sync generators, employing a master oscillator whose output is coupled to horizontal and vertical sync shaping networks through regular frequency divider networks, having appropriate numerical values of count down or dividing action, slippage or shift between the local vertical sync and the horizontal sync pulses may be accomplished in a variety of ways. For instance, in one exemplary form, an electronic switch or variable conductance channel is interposed between the output of the master oscillator and the input of the vertical frequency divider. This electronic switch is then controlled by a variable width pulse which is developed by a vertical sync pulse comparator circuit. Both local and horizontal vertical sync pulses are substractively combined so that there will be an output correction pulse from the vertical sync comparator circuit only during intervals in which local and remote vertical sync pulses fail to coincide. Thus under conditions of coincidence no correction pulse for the electronic switch is developed and slippage or shift between the local vertical sync and horizontal sync pulses is discontinued, thereby allowing a continuance of lock in between local and remote sync generators. A typical device for synchronizing local sync generators to remote sync generators is shown and described in U.S. Patent No. 2,655,556, entitled, "Synchronizing System," issued October 15, 1953, to Robert C. Abelson.

In the utilization of systems to automatically lock two sync pulse generators in phase a difficulty sometimes occurs when noise pulses or other random signals cause unintended shift or slippage between the local vertical sync and the horizontal sync pulses.

The present invention in its more general form contemplates the use of a selective device to discriminate against noise or other random signals which would cause an undesired phase shift between the local vertical sync and the horizontal sync pulses, but which will allow an intended correction signal to pass and to cause the desired phase shift. The correction signals which will create the phase shift are formed to have two parts or pulses, a first circuit is provided to generate a control signal only when it receives both parts of the correction signal, and a second circuit generates a phase shifting pulse upon receiving the control signal from the first circuit, plus the second part of the correction signal. In that manner signals other than those of a predetermined form will not generate the phase shifting pulse.

Referring to Figure 1, there is shown a television receiver 10 for receiving a television signal. Connected to the television receiver 10 is a sync separator 12, for separating the vertical and the horizontal sync signals from the video signals and from each other. The sync separator 12 is connected to a pulse inverter circuit 14, in such a manner as to apply the vertical sync signal from a remote sync signal generator to the pulse inverter 14. The inverted remote vertical sync signal is then fed to pulse widening circuit 16 and widened. Pulse widening circuit 16 consists of a monostable multivibrator which when triggered forms a pulse of predetermined duration. The output from the pulse widening circuit 16 which is a pulse of increased duration is coupled to the grid of a tube 22. A local sync generator 32 which is of a type similar to that shown and described in RCA Review for July 1940, volume 5, No. 1, pages 51–68, is operatively connected to be controlled by a local sync generator phase control circuit 34. The local sync generator 32 is connected to apply a vertical sync signal to a grid of a tube 24. The tube 22 and the tube 24 with their associated circuitry form a pulse adder 20. The vertical sync signals pass through tubes 22 and 24 and form pulses as shown in curves 2 and 1 respectively at plate electrodes of the tubes 22 and 24, however, due to the fact that the tubes 22 and 24 have a common plate resistor 26 through which the total current from both the tubes 24 and 26 must flow, the pulses of curves 2 and 1 are added, and are shown separately only for purposes of illustration. Plate resistor 26 is connected to a pulse selective circuit 40 by means of a capacitor-resistor input circuit 42, and by a lead 46. The capacitor-resistor input circuit 42 is connected to a grid of a tube 44, and the lead 46 is connected to a cathode of a tube 48. Tubes 44 and 48 are operatively connected to a source of potential through load resistors 45 and 47 respectively. The plate of tube 44 is connected to the grid of tube 48, the grid of tube 48 being biased by a resistor 50 which is in turn connected to a source of negative potential. A cathode resistor 43 is connected between the cathode of the tube 48 and a point of reference potential, shown as ground, to allow the cathode of tube 48 to rise above reference potential. A capacitor 52 is also connected to the grid of tube 48 in such a manner as to provide an alternating current path to ground. The plate of tube 48 is further connected to the local sync generator phase control circuit 34, in such a manner as to pass a phase shifting pulse 5 to the local sync generator phase control circuit 34.

Figure 2:
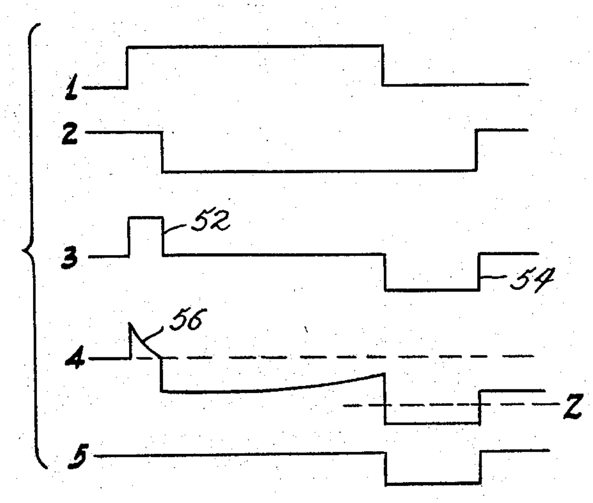
Figure 3:
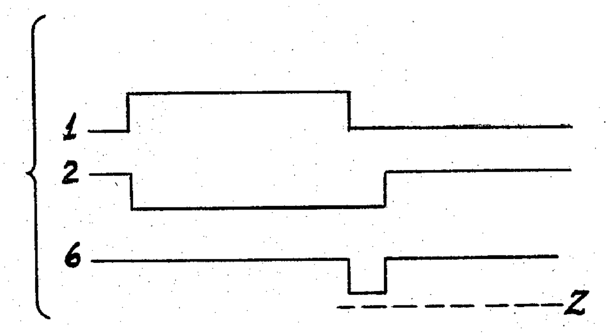

The operation of the system shown in Figure 1 may best be understood by reference also to Figures 2 and 3. First consider the operation of the circuit shown in Figure 1 during a period when the local sync signal is not in phase with the received remotely generated sync signal, and the local sync signal is being phase shifted. The curves of Figure 2 illustrate such an out of phase condition. During this time the leading edges of curves 1 and 2 will not coincide and the widened remote vertical sync pulse of curve 2 when additively combined with the local vertical sync pulse shown in curve 1, which is of opposite polarity, will result in the correction pulse as shown in curve 3. During a period when the leading edges of the pulse shown in curve 1 does not coincide with the leading edge of the pulse shown in curve 2 a positive pulse 52 will be generated, by the addition of the two pulses in plate resistor 26. The fact that the pulse of curve 2 is of longer duration will also cause a negative pulse 54 to be generated as shown in curve 3. The correction signal shown in curve 3 consisting of the voltage pulse 52 and the voltage pulse 54 and is the necessary signal for generating a pulse shown in curve 5 which will cause a phase shift in local sync generator 32 proportional to its duration. The application of the positive pulse 52 of curve 3 to the grid of tube 44 will drive the grid of tube 44 highly positive and will therefore cause the grid of tube 44 to draw grid current, the grid current will gradually lower the potential of the grid of tube 44 as shown at 56 on curve 4 which shows the voltage variation on the grid of tube 44 with respect to time. The exponential decline of the voltage of the grid of tube 44 due to grid current will be terminated by the trailing edge of the positive pulse 52 of curve 3 which will drive the grid of tube 44 negative. The positive pulse 52 of curve 3 applied at the cathode of tube 48 through the lead 46 will have no effect on tube 48 because tube 48 is already in a cut off state. The occurrence of the negative pulse 54 of curve 3 on the grid of the tube 44 now drives the grid of the tube 44 below the line $z$ and thus cuts off the tube 44. When tube 44 is cutoff the voltage at the plate of tube 44 rises thereby generating a control voltage. The voltage rise of the plate of tube 44 is coupled to the grid of tube 48 thereby tending to overcome the negative potential placed on the grid of tube 48 through the resistor 50. The positive potential on the grid of tube 48 is not sufficient to cause that tube to conduct. However, when this positive potential is applied jointly with the negative pulse 54 of curve 3, which is applied to the cathode of tube 48 through lead 46 and drives the cathode of tube 48 more negative, the tube 48 will be caused to conduct. Thus with the occurrence of a positive control voltage on the grid of tube 48 and a negative voltage on the cathode of tube 48 the tube 48 is driven into conduction, thereby lowering the plate voltage and forming an output or phase shift pulse shown in curve 5. The phase shift pulse shown in curve 5 will cause the local vertical sync to shift or slip with respect to the local horizontal sync, and therefore after a number of such shifts the remote and the local sync signals come into phase coincidence. A method of creating such a phase shift is shown and described in U.S. Patent No. 2,655,556, entitled "Synchronizing System," issued October 15, 1953, to Robert C. Ableson. The duration of the pulse 54 of curve 3 depends upon the degree of coincidence between the pulses of curves 1 and 2, in the event there is small coincidence the pulse 54 will be of a longer duration than if there is more coincidence. The duration of the pulse 54 of curve 3 controls the duration of the pulse of curve 5, therefore both curves are indicative of the degree of coincidence between the pulses of curves 1 and 2. The duration of the pulse of curve 5 will determine the amount of correction which must be made and will so control the local sync generator phase control circuit 34.

Consider now the operation of the circuit represented by Figure 1 during a period when the sync generators are in phase and no shift is desired. Voltage waves occurring during this period are shown graphically in Figure 3. During such a period the leading edge of the pulse shown in curve 2 will coincide with the leading edge of the pulse shown in curve 1. The coincidence of the pulses of curves 1 and 2 in adder circuit 20 causes the generation of a signal shown in curve 6 which consists solely of a negative pulse. The negative pulse of curve 5 is insufficient to drive the grid of tube 44 down to line $z$ which represents the cutoff level of tube 44, and therefore tube 44 continues to conduct. As long as tube 44 continues to conduct no control signal is generated at its plate and the grid of tube 48 remains at negative potential. The application of the pulse shown in curve 5 to the cathode of tube 48 through lead 46 is insufficient to cause tube 48 to conduct due to the negative voltage on the grid of tube 48.

Random signals of a positive nature may cause the grid of tube 44 to draw grid current, however, unless such signals are immediately followed by a negative signal the tube 44 will continue to conduct, as the grid current will merely cause the grid of tube 44 to exponentially drop to its usual level but not to line $z$ where tube 44 becomes cut off.

Consider now that the coincidence of the pulses is more remote and that for instance the negative pulse occurs remote from the positive pulse. The time constants of the circuit must, to cope with this possibility, be so arranged that tube 48 will pass a pulse for a predetermined period but no longer. In this regard it must be noted that several positive and negative pulses must be applied to the control grid of tube 44 before tube 48 will be energized. In this manner when pulses 1 and 2 occur remotely a pulse 5 is generated and the pulses 1 and 2 are moved more nearly into coincidence.

The invention claimed is:

1. A circuit arrangement for controlling the production of pulses by a local pulse generating circuit in phase with remotely generated received pulses of substantially the same duration and recurrence rate, including means to lengthen the duration of one of said pulses, means to add said locally generated pulses and said lengthened pulses simultaneously to produce a pulse signal comprising a positive going pulse under phase relationships requiring correction, and a negative going pulse, means coupled to said adding means to produce an output pulse only in response to a positive going pulse followed by a negative going pulse, and phase shifting means coupled to said local pulse generating circuit and responsive to said output pulse to shift the phase of said local pulse generating circuit.

2. A circuit arrangement for controlling the production of pulses by a local pulse generating circuit in phase with remotely generated received pulses of substantially the same duration and recurrence rate, including a pulse widening circuit to lengthen the duration of said received pulses by a given time element, an adding circuit to add said locally generated pulses and said lengthened pulses simultaneously without regard to phase relationship to produce a pulse signal comprising a positive going pulse under phase relationships requiring correction and a negative going pulse, a discriminating circuit coupled to said adding circuit to produce an output pulse only in response to a positive going pulse followed by a negative going pulse, and a phase shifting circuit coupled between said local pulse generating circuit and said discriminating circuit to shift the phase of said local pulse generating circuit to produce pulses substantially in-phase with said remotely generated pulses.

3. A pulse signal phasing circuit arrangement, including a remotely generated pulse deriving circuit, a pulse lengthening circuit coupled to said pulse deriving circuit, a local pulse generating circuit, a local pulse phase controlling circuit coupled to said local pulse generating circuit, a pulse adding circuit coupled to said pulse lengthening circuit and to said local pulse generating circuit to combine said pulses simultaneously to produce a pulse signal comprising a negative going pulse and a pulse discriminating circuit coupled to said pulse adding circuit to produce an output pulse only in response to a positive going pulse followed within a predetermined time interval by said negative going pulse and coupled to said local pulse phase controlling circuit to shift the locally generated pulses substantially in-phase with the derived pulses.

References Cited in the file of this patent

UNITED STATES PATENTS

| | | |
|---|---|---|
| 2,399,135 | Miller | Apr. 23, 1946 |
| 2,405,237 | Ruhlig | Aug. 6, 1946 |
| 2,510,167 | Boothroyd | June 6, 1950 |
| 2,545,464 | Hoeppner | Mar. 20, 1951 |
| 2,551,280 | Moe | May 1, 1951 |
| 2,594,276 | Barker | Apr. 29, 1952 |
| 2,668,236 | McCoy | Feb. 2, 1954 |
| 2,677,758 | Robinson et al. | May 4, 1954 |
| 2,681,414 | Strandberg | June 15, 1954 |
| 2,794,123 | Younker | May 28, 1957 |
| 2,806,946 | Rich | Sept. 17, 1957 |